(12) United States Patent
Gutierrez et al.

(10) Patent No.: US 7,454,375 B1
(45) Date of Patent: *Nov. 18, 2008

(54) COMPUTER READABLE MEDIUM FOR ACCELERATING SARBANES-OXLEY (SOX) COMPLIANCE PROCESS FOR MANAGEMENT OF A COMPANY

(75) Inventors: John Gutierrez, Coppell, TX (US); Blake Sellers, Dallas, TX (US)

(73) Assignee: Avalon Consulting, LLC, Dallas, TX (US)

( * ) Notice: Subject to any disclaimer, the term of this patent is extended or adjusted under 35 U.S.C. 154(b) by 337 days.

This patent is subject to a terminal disclaimer.

(21) Appl. No.: 11/315,916

(22) Filed: Dec. 22, 2005

(51) Int. Cl.
*G06Q 40/00* (2006.01)
(52) U.S. Cl. ...................................... 705/35
(58) Field of Classification Search ............... 705/1, 705/35, 36 R, 30; 707/9
See application file for complete search history.

(56) References Cited

U.S. PATENT DOCUMENTS

| | | | |
|---|---|---|---|
| 2005/0065839 A1* | 3/2005 | Benson et al. | 705/10 |
| 2005/0138031 A1* | 6/2005 | Wefers | 707/9 |
| 2005/0228685 A1* | 10/2005 | Schuster et al. | 705/1 |
| 2006/0059026 A1* | 3/2006 | King et al. | 705/7 |
| 2006/0129441 A1* | 6/2006 | Yankovich et al. | 705/8 |
| 2006/0212487 A1* | 9/2006 | Kennis et al. | 707/200 |
| 2006/0259316 A1* | 11/2006 | Breslin et al. | 705/1 |
| 2007/0055596 A1* | 3/2007 | Yankovich et al. | 705/35 |
| 2007/0078701 A1* | 4/2007 | Bliznak | 705/11 |
| 2007/0233508 A1* | 10/2007 | Gillespie | 705/1 |

OTHER PUBLICATIONS

MetricStreams Press Release (www. metricstream.com/pressNews/pressrelease_41.htm): Advanced Equities selects MetricStreams for Sarbanes-Oxley Compliance, May 11, 2005, pp. 1-2.*

* cited by examiner

*Primary Examiner*—Hani Kazimi
*Assistant Examiner*—Bijendra K Shrestha
(74) *Attorney, Agent, or Firm*—Buskop Law Group, PC; Wendy Buskop

(57) ABSTRACT

Computer readable medium for performing a method for accelerating Sarbanes-Oxley (SOX) compliance for management of a company includes defining scope components needed for Sarbanes-Oxley compliance by the company, establishing internal controls for achieving Sarbanes-Oxley compliance for the scope components, and operating the internal controls using an internal controls library comprising parameters to be used in planning, testing, and evaluating the internal controls for achieving Sarbanes-Oxley compliance for the scope components. Internal controls for achieving Sarbanes-Oxley compliance, that are outside of the parameters of the internal controls library, are remediated to create effective internal controls. The computer readable medium includes monitoring the internal controls and the remediating of the internal controls on a real time basis for achieving Sarbanes-Oxley compliance, and certifying the company by preparing certifications, assertions, and reports relative to the achieved Sarbanes-Oxley compliance using the monitored internal controls and remediated internal controls.

18 Claims, 8 Drawing Sheets

COMPUTER READABLE MEDIUM FOR ACCELERATING SARBANES-OXLEY (SOX) COMPLIANCE PROCESS FOR MANAGEMENT OF A COMPANY

FIELD

The embodiments relate to computer readable medium for performing methods for accelerating Sarbanes-Oxley compliance process for management of a company.

BACKGROUND

Significant changes to corporate governance and accountability occurred in fiscal year 2002 with the approval of the United States (U.S.) federal Sarbanes-Oxley Act (SOX). Officially titled the *Public Company Accounting Reform and Investor Protection Act* and signed into law on Jul. 30, 2002, the Sarbanes-Oxley Act was approved for the purpose of improving the accuracy, integrity, and reliability of corporate disclosures and governance as well as regulation with regard to United States securities laws.

The Sarbanes-Oxley Act provides protection to investors and shareholders of public companies by mandating a set of internal procedures regarding corporate accountability, audit requirements, and compliance. The Act covers such issues as establishing a public company accounting oversight board, auditor independence, corporate responsibility and governance, corporate certification requirements, and enhanced financial disclosure including a code of ethics. Further, the Sarbanes-Oxley Act creates an obligation for officers and directors of a company to warrant to their shareholders or to their investors the accuracy of the company's accounting information, the internal controls in place to safeguard the assets of the company, and the validity of the reports and financial statements produced. Accordingly, the Federal Sentencing Commission has significantly enhanced penalties for the more serious corporate crimes, in response to the U.S. federal Sarbanes-Oxley Act.

The Sarbanes-Oxley Act codifies a framework of three categories of internal controls for regulating accountability, governance, and compliance with regard to the Act, namely, Risk Assessment, Control Environment, Control Activities, Information and Communications, and Monitoring. Although compliance with the Act serves to mitigate, or avoid completely, any opportunities for fraudulent reporting and any associated risks, the more important aspects of the framework of the Sarbanes-Oxley Act are that it provides the benefits of increased corporate integrity and accountability which can lead to increased stock and overall company value.

Compliance with the Sarbanes-Oxley Act is accordingly an urgent issue for many public companies, particularly the companies that lack knowledge of the Act or that lack the management expertise or capabilities for addressing the Sarbanes-Oxley requirements and implementation of the internal controls for Sarbanes-Oxley compliance.

A need exists for methods for accelerating the process to efficiently establish Sarbanes-Oxley compliance within a company.

A need exists for methods to establish and implement efficiently internal controls testing and monitoring within a company to mitigate any assessed company risks and to provide improvements for company management and operations in compliance with the Sarbanes-Oxley Act.

The present embodiments meet these needs.

BRIEF DESCRIPTION OF THE DRAWINGS

The detailed description will be better understood in conjunction with the accompanying drawings as follows.

Figure 1:
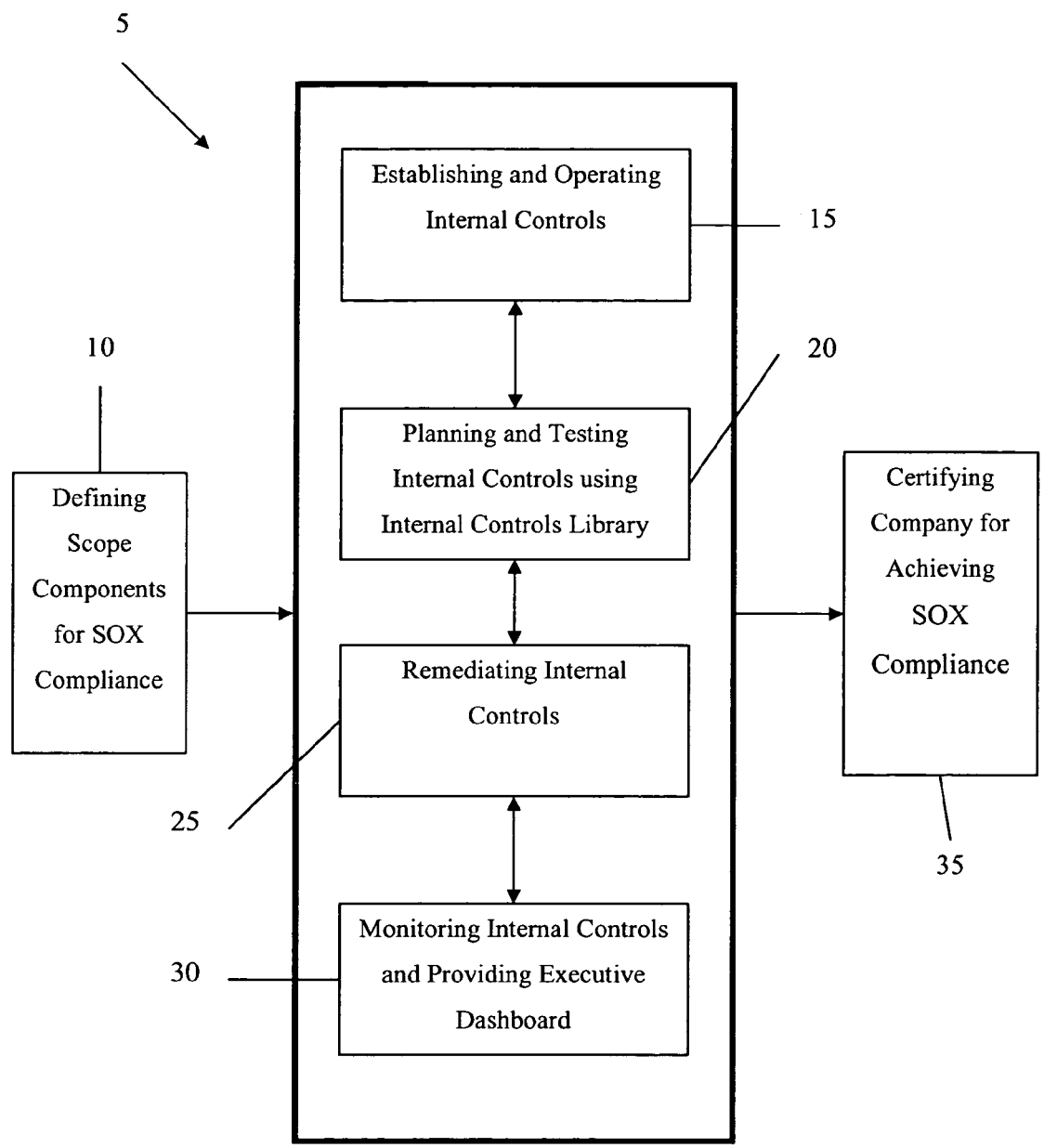
FIG. 1 depicts a flow diagram of a Sarbanes-Oxley compliance process usable in a method for accelerating Sarbanes-Oxley compliance for management of a company.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The embodiments include computer readable medium having stored thereon a plurality of instructions, the plurality of instructions including instructions which, when executed by a processor, cause the processor to perform the methods for accelerating Sarbanes-Oxley compliance in a company can include providing the company with an efficient process for complying with the Sarbanes-Oxley Act and subsequently increasing company integrity. The methods provide the company with real time metrics and an executive dashboard for the management of financial reporting controls structure and of the overall operating controls environment. In addition, the methods provide a Sarbanes-Oxley compliance process that can encompass improvements to operation efficiency. The operation efficiency is achieved by reducing the time required to test, remediate, and maintain internal controls by facilitating managerial controls and operations, by evaluating materiality of control deficiencies, and by performing periodic assertions. Compliance to the Sarbanes-Oxley Act provides companies the ability to mitigate, or avoid completely, any fraudulent reporting or associated company procedural risks, which can ultimately strengthen the company's reliability, accountability, and value.

The embodiments include defining scope components that can be required for Sarbanes-Oxley compliance by the management of the company. Internal controls can be established for achieving Sarbanes-Oxley compliance with regard to the scope components for the company. Internal controls can be established and can be operated using an internal controls library. The internal controls library includes parameters for determining the effectiveness or ineffectiveness of the internal controls.

The internal controls library can be a centralized library both maintained and kept by a third party or kept and controlled by the company. In one embodiment of the library, the library is organized by a flexible hierarchy and is organized to reflect how a company wants to represent business entities, functional areas, process ownership, internal control ownership and maintenance throughout their organization. Companies can setup business processes and related controls and then copy, or extend them, to other nodes or business areas in the hierarchy. If the third party maintains the library, the third party can store all relevant best practice control characteristics or fields as defined by generally accepted controls frameworks, such as COSO and COBIT. The third party can maintain the library to allow for customizable fields unique to a specific company. The library can be organized to include the ability to capture internal controls test steps in each of the control records. The internal controls library can establish the initial internal controls data as one step in the process, can define all relevant COSO components, can define or copy to relevant internal controls to subsidiaries, and can be integrated with workflow items.

From the internal controls library, automated generation of controls test details sheets, pre-populated with information, can be created. Standard internal control can be stored in the internal controls library. To increase the efficiency of the testing process, the test steps are automatically copied into the test details sheet used to facilitate execution of a test and can serve as an audit trail for the testing process. The test steps that are automatically copied into the test details sheet can be based on internal controls specified by a company or can be generalized (for example, the test detail sheet can be automatically generated for all software businesses).

The embodied methods on computer readable medium can utilize data storage for electronic retention of all supporting evidence, audit work-papers and approvals as native to the testing work-flow and testing library.

The methods include planning or designing internal controls and, then, testing the internal controls for the purpose of achieving Sarbanes-Oxley compliance for the scope components for the company. Throughout the methods, the internal controls are "dynamic", meaning that the internal controls are to be continuously maintained in order to properly address changes in the business. For example, a company may change in size due to an acquisition or divestiture, a company may modify business organization (for example, consolidated numerous departments into one centralized shared services department), or a company may change technology (for example, consolidated switch from three separate software applications to one centralized, integrated application system) to meet specific business requirements The internal controls are evaluated or compared to the parameters of the internal controls library. If the internal controls are within the parameters of the internal controls library, then the internal controls are deemed effective. If the internal controls do not match or are outside the parameters of the internal controls library, then the internal controls are remediated, modified, or corrected. The purpose of the modification or remediation of the internal controls is to create effective internal controls for achieving Sarbanes-Oxley compliance. The methods on computer readable medium can include monitoring the internal controls and the remediating of the internal controls on a real time basis for achieving Sarbanes-Oxley compliance and, then, certifying the company by preparing certifications, assertions, and reports relative to the achieved Sarbanes-Oxley compliance using the monitored internal controls and remediated internal controls.

Regarding the Sarbanes-Oxley requirement for companies to test their system of internal controls, the embodied computer readable instructions provide management with a discrete set of conclusions regarding the effectiveness those internal controls for specific set of "occurrences" even as the internal controls change. This aspect of the embodied computer readable instructions solves the problem of a company testing complying once with regard to the Sarbanes-Oxley standards, then believing the company is in compliance after the company has changed. The methods provide a "static" test to continuously or periodically test the dynamic internal controls.

With regard to the figures, FIG. 1 depicts a flow diagram of a Sarbanes-Oxley compliance process (5) usable in an embodiment of a method on computer readable media for accelerating Sarbanes-Oxley compliance for management of a company. The computer readable instructions for accelerating the Sarbanes-Oxley compliance process can begin by defining the scope components needed for Sarbanes-Oxley compliance (10). An example of how the scope components can be defined is by defining the scope components based on an annual basis for achieving and maintaining Sarbanes-Oxley compliance by the company. Another example of how the scope components can be defined is by defining a value for scope components, such as a particular or required process, an entity, a technology, a location, and combinations thereof.

The methods on computer readable media can include establishing internal controls for achieving Sarbanes-Oxley compliance for the scope components, and operating the internal controls using an internal controls library (15). The internal controls library can include established parameters that can be used in planning, designing, testing, and evaluating the internal controls for effectiveness in achieving Sarbanes-Oxley compliance for the scope components (20). The internal controls associated with the identified scope components are compared to parameters in internal controls library to identify the internal controls that are outside of the parameters so those internal controls can be remediated to create effective internal controls (25). The scope components for the company can include processes, procedures, technologies, and entities of the company. The computer readable instructions can include planning and designing corresponding internal controls for the scope components, which can include designing internal controls for testing existing as well as newly created or revised company processes, procedures, and operations.

The embodiments of the method on computer readable media include monitoring the internal controls and the remediating of the internal controls on a real time basis for achieving Sarbanes-Oxley compliance (30), and certifying the company by preparing certifications, assertions, and reports relative to the achieved Sarbanes-Oxley compliance using the monitored internal controls and remediated internal controls (35).

Figure 2:
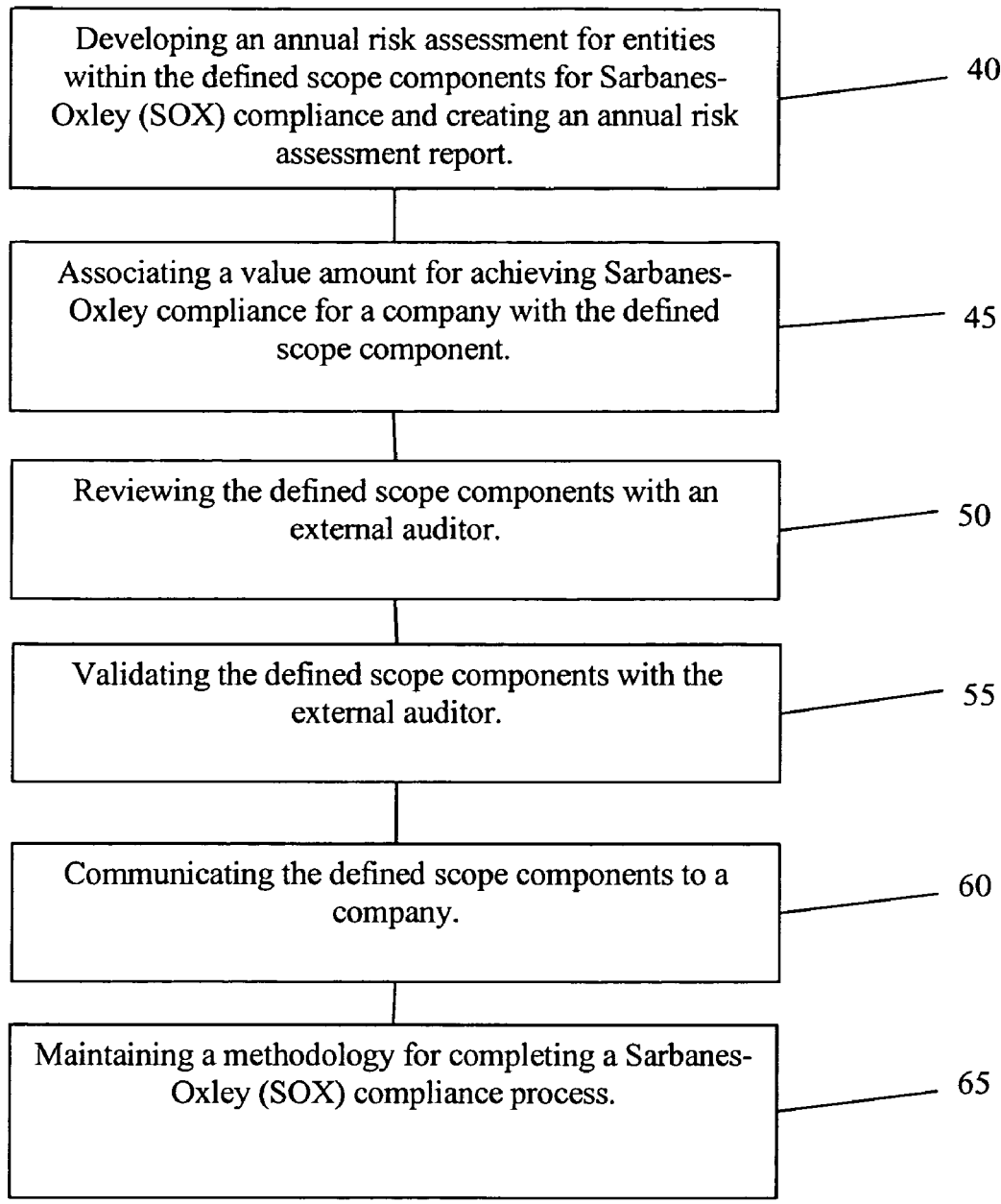
FIG. 2 depicts a diagrammatical plan for defining scope components usable in a method for accelerating Sarbanes-Oxley compliance for management of a company.

FIG. 2 depicts a diagrammatical plan for defining scope components (10) usable in a method on computer readable media for accelerating Sarbanes-Oxley compliance for management of a company (5). The defined scope components can include developing an initial, and annually thereafter, risk assessment for the company and entities within the company as an initial step to defining the scope components and internal controls needed by the company for achieving Sarbanes-Oxley compliance (40). The computer readable instructions include producing an annual risk assessment report after completion of each annual risk assessment (40).

Accelerating the Sarbanes-Oxley compliance process can include associating a value amount with the defined scope components (45). The methods on computer readable media continue by reviewing the defined scope components with an external auditor (50) and validating the defined scope components with the external auditor (55) in an efficient manner. The defined scope components can be communicated to the company (60), and a methodology can be maintained for annual compliance as well as the on-going practice of the Sarbanes-Oxley compliance process (65).

Figure 3:
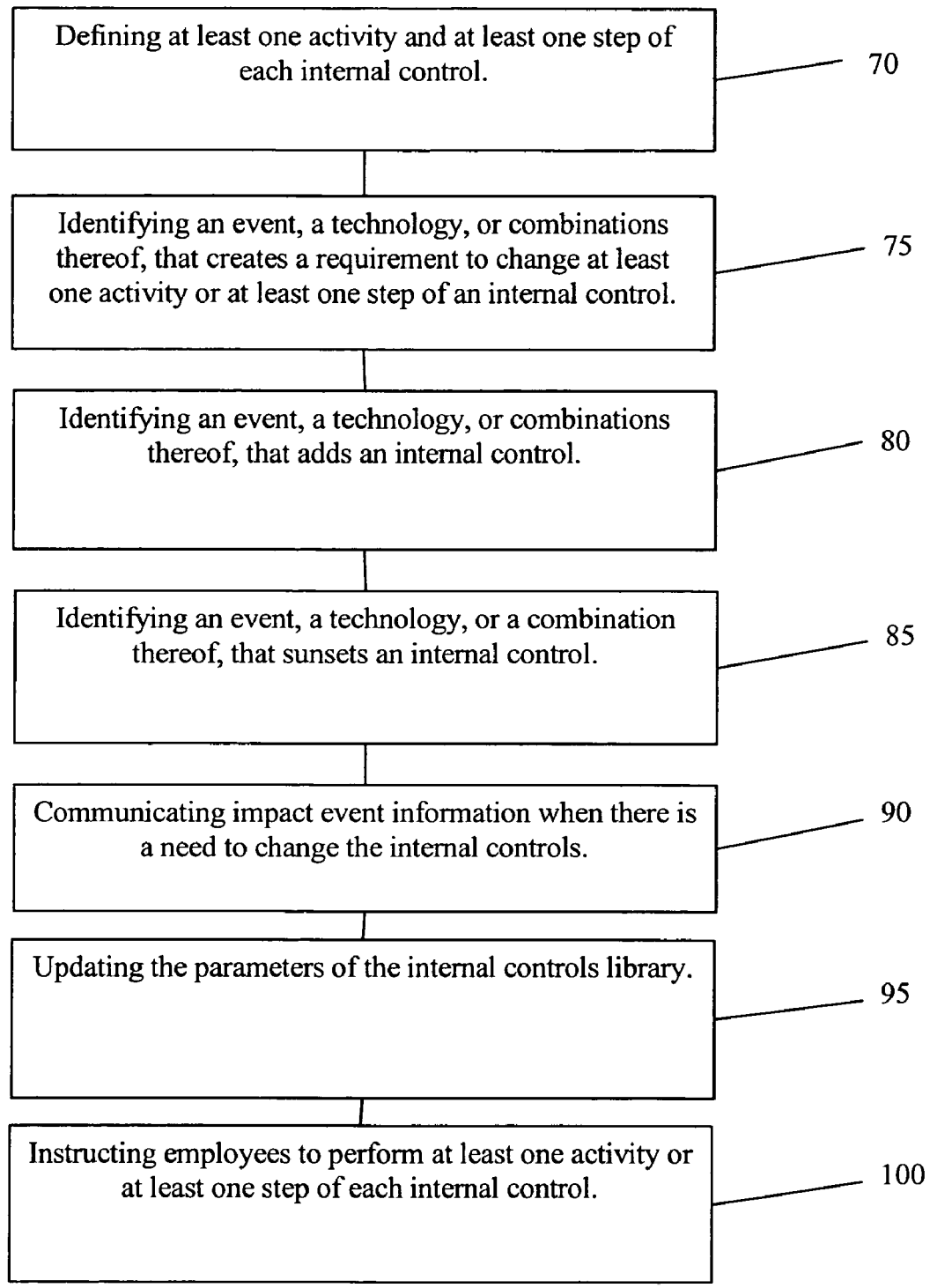
FIG. 3 depicts a diagrammatical plan for establishing internal controls and operating internal controls usable in a method for accelerating Sarbanes-Oxley compliance for management of a company.

FIG. 3 depicts a diagrammatical plan for establishing internal controls and operating internal controls, as depicted in FIG. 1. The planned steps of defining one or more activities and one or more steps of each internal control (70) with regard to the company for achieving and maintaining Sarbanes-Oxley compliance, and identifying an event, a technology, or combinations thereof, that creates a requirement to change one or more activities or one or more steps of each internal control (75). The computer readable instructions can include identifying an event, a technology, or combinations thereof, that adds the internal controls (80) as needed by the company for maintaining Sarbanes-Oxley compliance, as well as identifying an event, a technology, or a combination thereof, that sunsets or discontinues the internal controls (85) that are no longer needed or required. The computer readable instructions can include: communicating impact event information when there is a need to change the internal controls (90), updating the parameters of the internal controls library (95) to accommodate multiple control frameworks or business changes, and instructing employees to perform one or more activities or one or more steps of each internal control (100).

Figure 4:
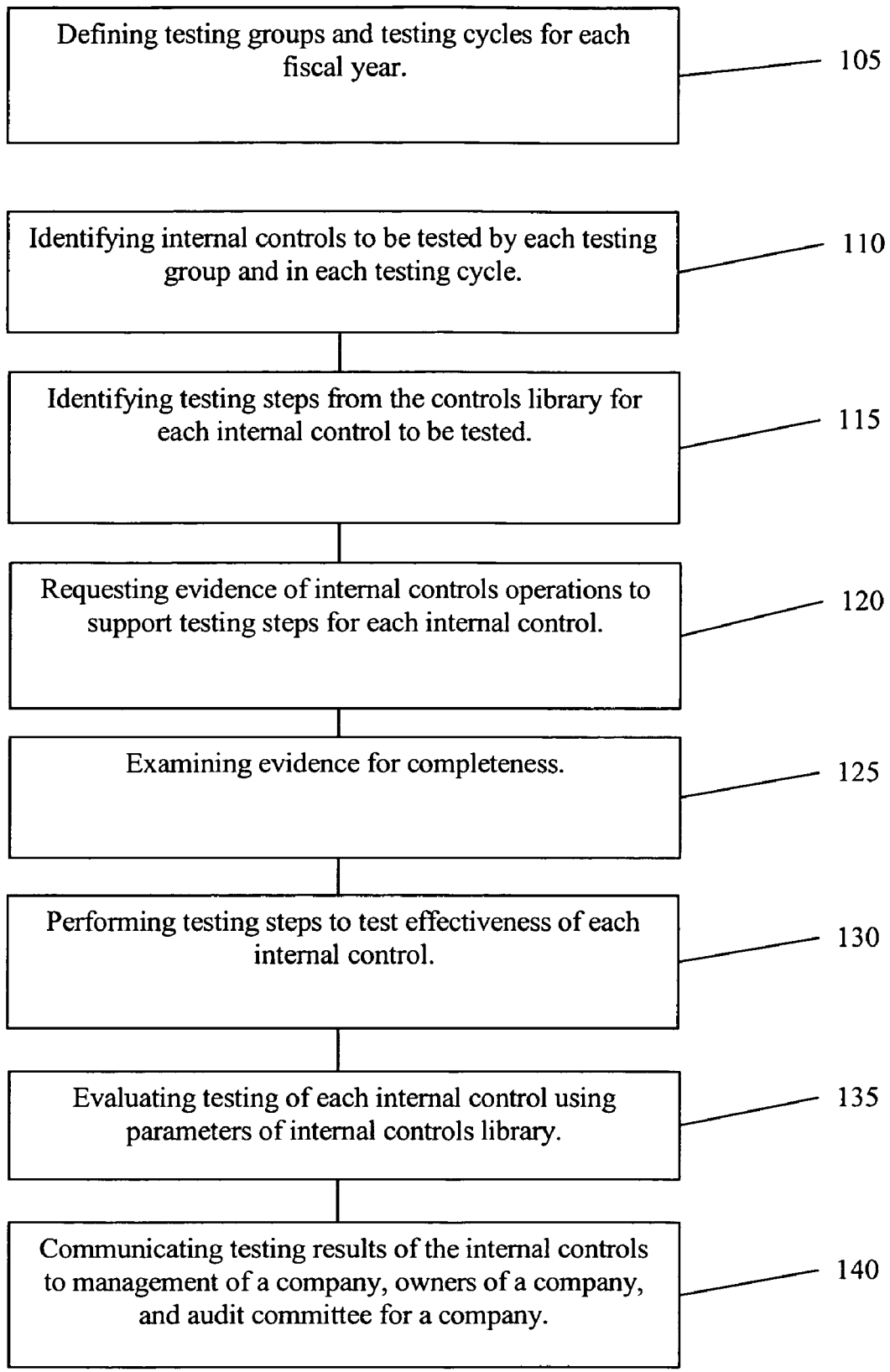
FIG. 4 depicts a diagrammatical plan for planning, testing, and evaluating the effectiveness of internal controls usable in a method for accelerating Sarbanes-Oxley compliance for management of a company.

FIG. 4 depicts a diagrammatical plan for planning, testing, and evaluating the effectiveness of the internal controls (20), as depicted in FIG. 1. The computer readable instructions can include the planned steps of designing or planning the internal controls to be used by the company for achieving and maintaining Sarbanes-Oxley compliance, and testing the internal controls for achieving Sarbanes-Oxley compliance for the scope components. Then, the tested internal controls for achieving Sarbanes-Oxley compliance can be evaluated using the parameters of the internal controls library to determine the effective internal controls that are within the parameters, and the ineffective internal controls that are outside the parameters.

The embodiments of a method on computer readable media can include defining testing groups and testing cycles for each fiscal year (105), identifying the internal controls to be tested by each testing group and in each testing cycle (110), and identifying testing steps for each internal control to be tested (115). The computer readable instructions can include requesting evidence of internal controls operations to support testing for each internal control (120), and preparing and examining the evidence for completeness (125). The evidence of the internal controls operations can include: an observation, an answer to a query, a document, and combinations thereof. Testing can be performed to test effectiveness of each internal control (130), and the testing of each internal control can be evaluated using the parameters of the internal controls library (135) to determine effectiveness of the internal controls. The testing results of the internal controls can be communicated to the management of a company, owners of a company, an audit committee for a company, and combinations thereof (140).

The embodied computer readable instructions allow for internal controls testing across many testing groups (for example, internal audit, external audit, operational peer review). The number of testing groups can vary, but is usually based on the number of groups the company wants to establish. The testing is further facilitated through flexible testing cycles. In one embodiment, the methods on computer readable media can include a testing step, wherein the company can establish many different testing groups, with potential overlap regarding testing off specific controls. These embodied methods differs from other solutions where only one test plan is provided. The company can then use the results from the testing of the different groups in support of a company's overall Sarbanes-Oxley certifications and assertions.

As discussed above, the internal controls are "dynamic" in that the internal controls can change as the company changes. In testing the internal controls, the computer readable instructions can incorporate analyzing the internal controls in various stages as a cycle. The computer readable instructions can entail applying a rating system in conjunction or not in conjunction with an executive dashboard. The rating system can relate to the various iterative "stages", or statuses, a control may follow.

As an example, a stop-light analogy can be used to reflect the status of each specific control at any given time. A high green light or effective status can be given if a control was effective based on the last test result. A low green light or effective status can be given if the same control was effective last time the control was tested and is now scheduled for additional testing. A low red light or ineffective status can be given if the same control tests with exceptions/fails a test. A high red light or ineffective status but showing some incremental progress status can be given if the same control that tested ineffective is now in remediation. A yellow light or ineffective but significantly progressing toward effective status can be given if the same control has now been remediated and is schedule for remediation testing. The green light or effective status can be given if the same control successfully completes remediation testing. The embodied methods allow for different flexible parameters for standard testing versus remediation testing contemplated within these embodiments. Different rules can be used and considered effective under the different testing contemplated.

Figure 5:
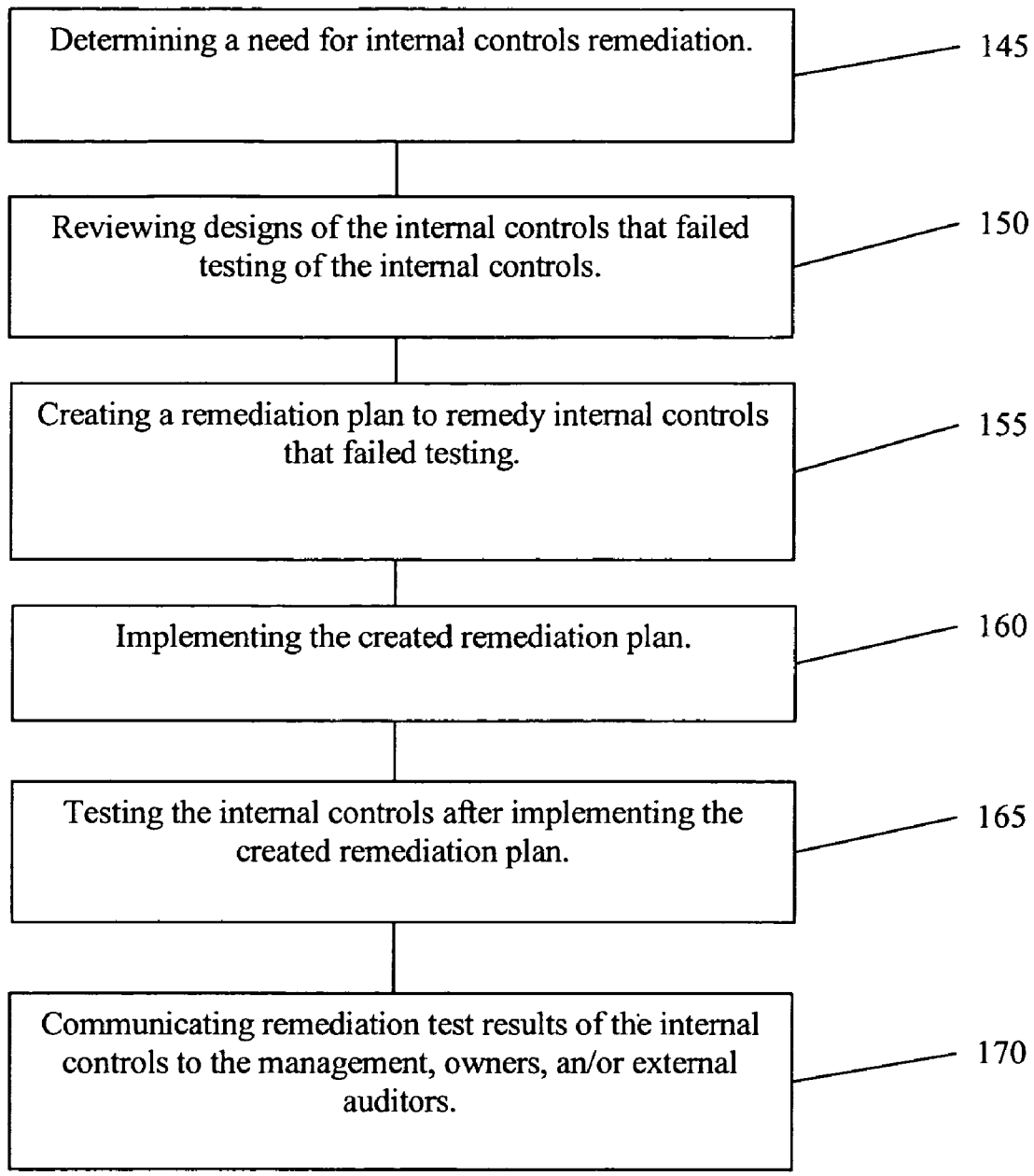
FIG. 5 depicts a diagrammatical plan for remediating ineffective internal controls usable in a method for accelerating Sarbanes-Oxley compliance for management of a company.

FIG. 5 depicts a diagrammatical plan for remediating ineffective internal controls or internal controls that are outside of the parameters of the internal controls library to create effective internal controls (25), as depicted in FIG. 1. The embodiments of a method on computer readable media can include the planned steps of determining a need for internal controls remediation (145) by reviewing designs of the internal controls that failed testing (150), creating a remediation plan to remedy internal controls that failed testing (155), and implementing the created remediation plan (160). After implementing the created remediation plan, the internal controls can be tested (165) to determine effectiveness, which can include remediation testing, testing of a previously tested internal control, and combinations thereof. The remediation test results of the internal controls can be communicated to the management and the owners of the company (170).

Figure 6:
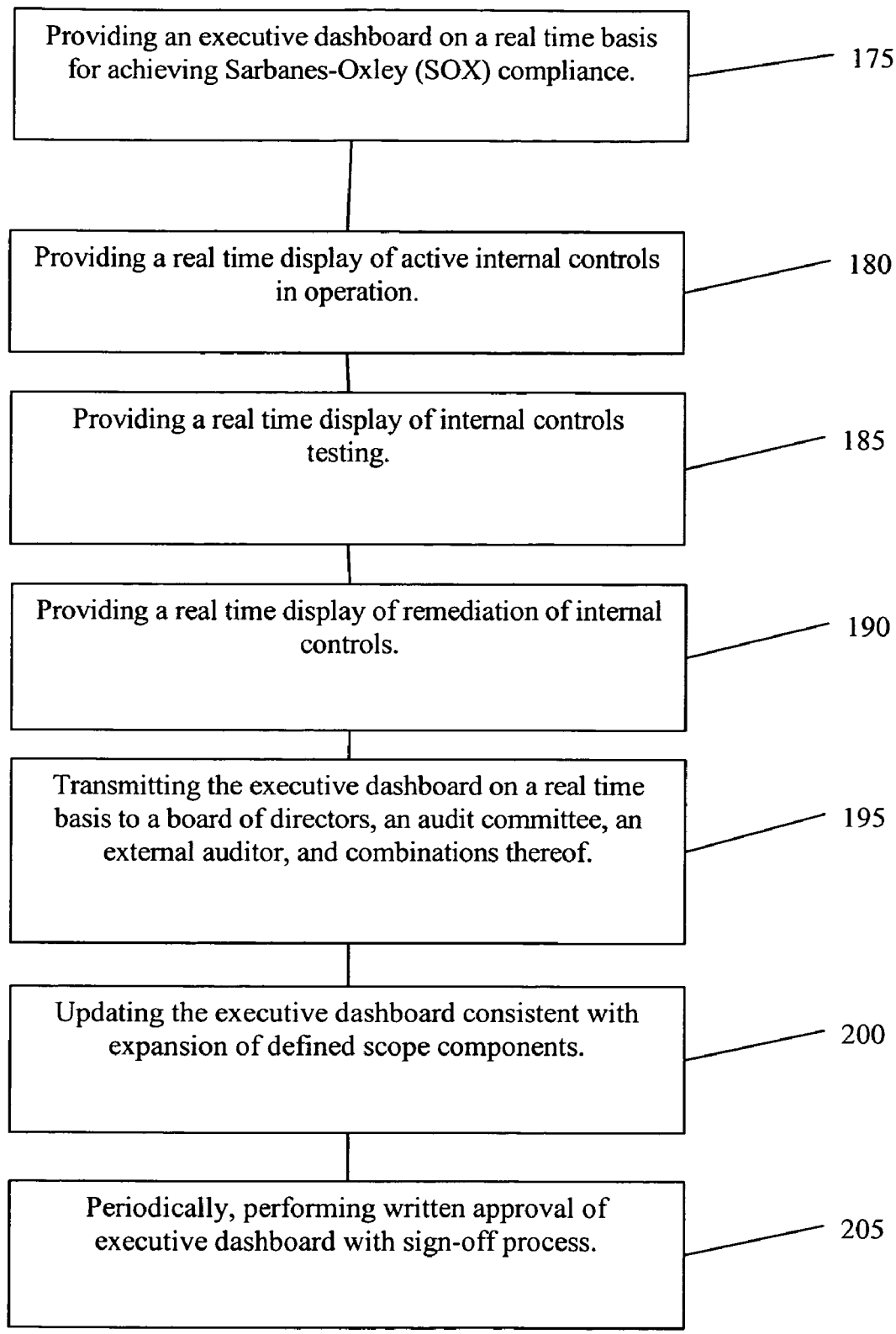
FIG. 6 depicts a diagrammatical plan for monitoring effectiveness of internal controls usable in a method for accelerating Sarbanes-Oxley compliance for management of a company.

FIG. 6 depicts a diagrammatical plan for monitoring effectiveness of internal controls (30), as depicted in FIG. 1. The embodiments of a method on computer readable media for accelerating Sarbanes-Oxley compliance for management of a company can include the planned steps of monitoring the internal controls and the remediating of the internal controls on a real time basis for achieving Sarbanes-Oxley compliance (30), and for providing an executive dashboard on a real time basis for achieving Sarbanes-Oxley compliance (175). In providing the executive dashboard on a real time basis for monitoring the internal controls, the computer readable instructions can include: providing a real time display of internal controls in operation (180), providing a real time display of internal controls testing (185), providing a real time display of remediation of internal controls (190), and combinations thereof. Next, the executive dashboard for achieving Sarbanes-Oxley compliance can be transmitted to: a board of directors, an audit committee, an external auditor, and combinations thereof (195) for review and validation.

The embodiments of a method on computer readable media can include updating the executive dashboard consistent with the expansion of the defined scope components required for Sarbanes-Oxley compliance for the company (200). Further, the computer readable instructions can include, performing a written approval of the executive dashboard for monitoring the internal controls, which can include a sign-off process for management (205).

Figure 7:
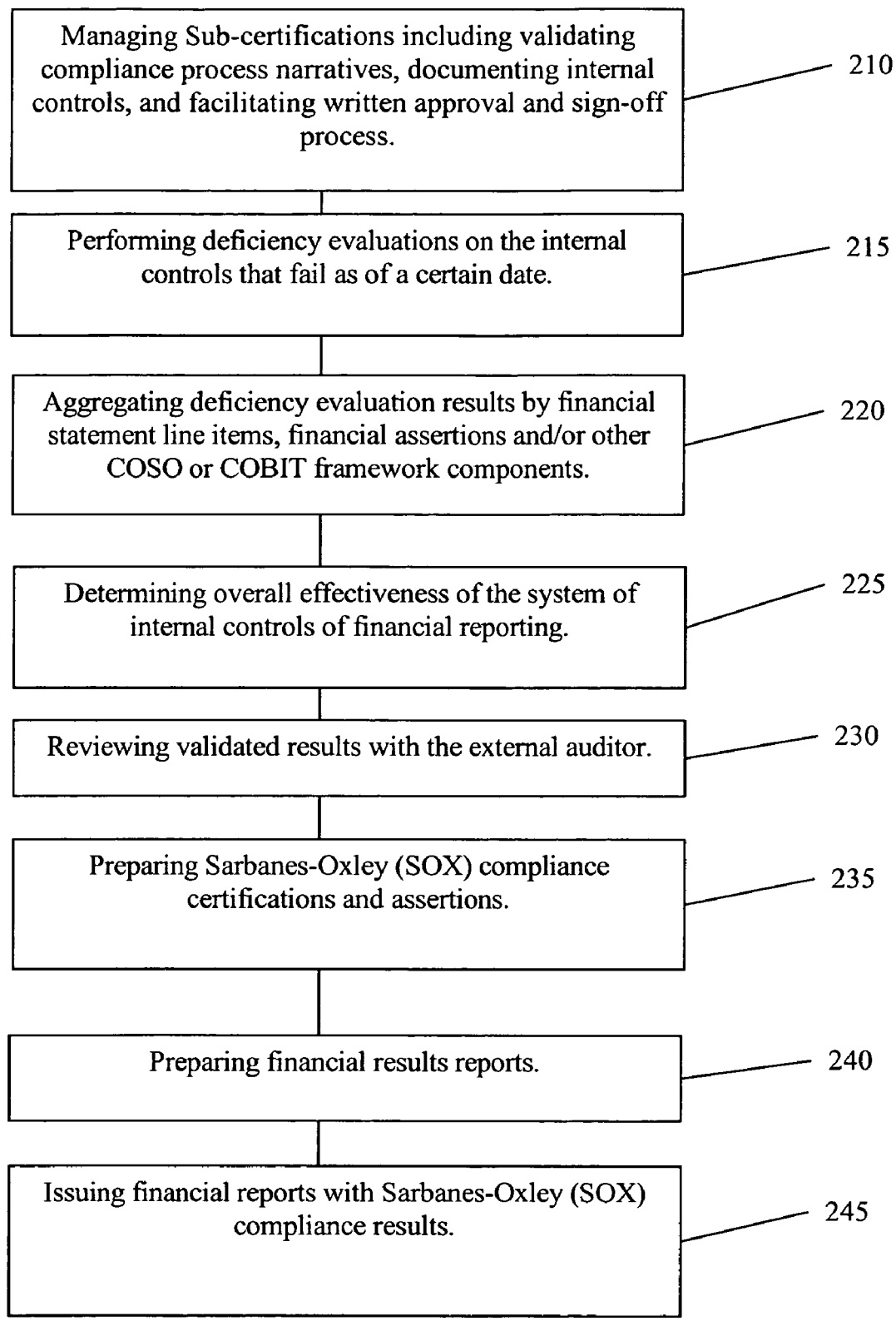
FIG. 7 depicts a diagrammatical plan for Sarbanes-Oxley compliance certification of a company.

FIG. 7 depicts a diagrammatical plan for Sarbanes-Oxley compliance certification of the company (35), as depicted in FIG. 1. The methods on computer readable media for accelerating Sarbanes-Oxley compliance can include the steps of certifying the company by preparing certifications, assertions, and reports relative to the achieved Sarbanes-Oxley compliance using the monitored internal controls and remediated internal controls. The certification process can include managing a sub-certification form completion process that includes: validating compliance process narratives for completeness and accuracy, revising documentation of controls, and facilitating sign-off on sub-certification by management and owners of the company (210). The certification process is flexible and can include sub-certification and/or multiple levels of sign off.

The embodiments can include the next steps of: performing deficiency evaluations on the internal controls that fail as of a certain date (215), aggregating deficiency evaluation results by financial statement line item (220), determining effectiveness of internal controls (225), and reviewing validated results with the external auditor (230). This can facilitate the Sarbanes-Oxley requirement for the independent or external auditor's review of management testing and subsequently reduce auditing fees. The certification process can include preparing Sarbanes-Oxley compliance certifications and assertions (235), and preparing financial results reports (240) or other testing results reports for each management area. Each management area can, then, certify a design or a plan, the maintenance, the testing, and combinations thereof, with regard to the internal controls for their area of the company in achieving and maintaining Sarbanes-Oxley compliance.

Finally, the annual certification process can conclude by issuing financial reports with Sarbanes-Oxley compliance results (245) for the year, which then complies with the on-going Sarbanes-Oxley compliance process.

The computer readable instructions can further include steps directed toward establishing year-end evaluation of ineffective controls process. All supporting evidence, audit work-papers and approvals associated with the steps of establishing Sarbanes-Oxley compliance can be codified. The codified result takes the complex audit evaluation process and creates an output that a "layman" or non-audit experienced staff member, process owner and/or executive, can easily follow. In addition to codifying the complex, individual controls deficiency evaluating process, the computer readable instructions provide functionality for management to aggregate individual deficiencies to determine if the company collectively has a significant deficiency or material weakness. For example, the computer readable instructions can create a report that presents the five deficient controls related to Capital Leases, thereby enabling management to create an opinion as to the collective impact that the deficiencies may have on financial reporting. The codified results from the embodied computer readable instructions facilitate Sarbanes-Oxley compliance process since the codified result serves as supporting evidence for a company's Sarbanes-Oxley compliance assertion.

In establishing an audit trail, the computer readable instructions can include a request for evidence process and metrics for facilitating controls testing. The computer readable instructions can identify specific evidence required to test the operational effectiveness of a control and can build a detailed audit-trail of the test. The computer readable instructions can capture electronic copies of information supplied for a specific controls test and can establish key metrics to enable accountability within the organization. All requests for evidence can be time stamped in the system and then "aged" by how long it takes to supply the tester with the requested information. The request of evidence process can automatically generate e-mail requests for evidence and can generate random sample selections. Evidence that further supports the test that an internal control is effective can be uploaded. The request for evidence can include uploading the data and test details into the internal controls library.

In furtherance of establishing an audit trail, the embodied methods on computer readable media can include tracking the remediation process for ineffective internal controls. The ineffective internal controls can be tracked in order to identify, understand, and document a root cause for failure of a control. Tracking the remediation process can include an automatic generation of a request for remediation after each ineffective test. The request for remediation can be directed to the process owner for validation and/or approval. Tracking the remediation process can include updating a controls master data to reflect that the ineffective internal control is "in remediation." The computer readable instructions can include flexible parameters to allow management to manage the process requesting requests for remediation using metrics, such as aging. Tracking the remediation process can include following a "next occurrence" methodology and can be used to establish an audit trail with work-flow history.

Figure 8:
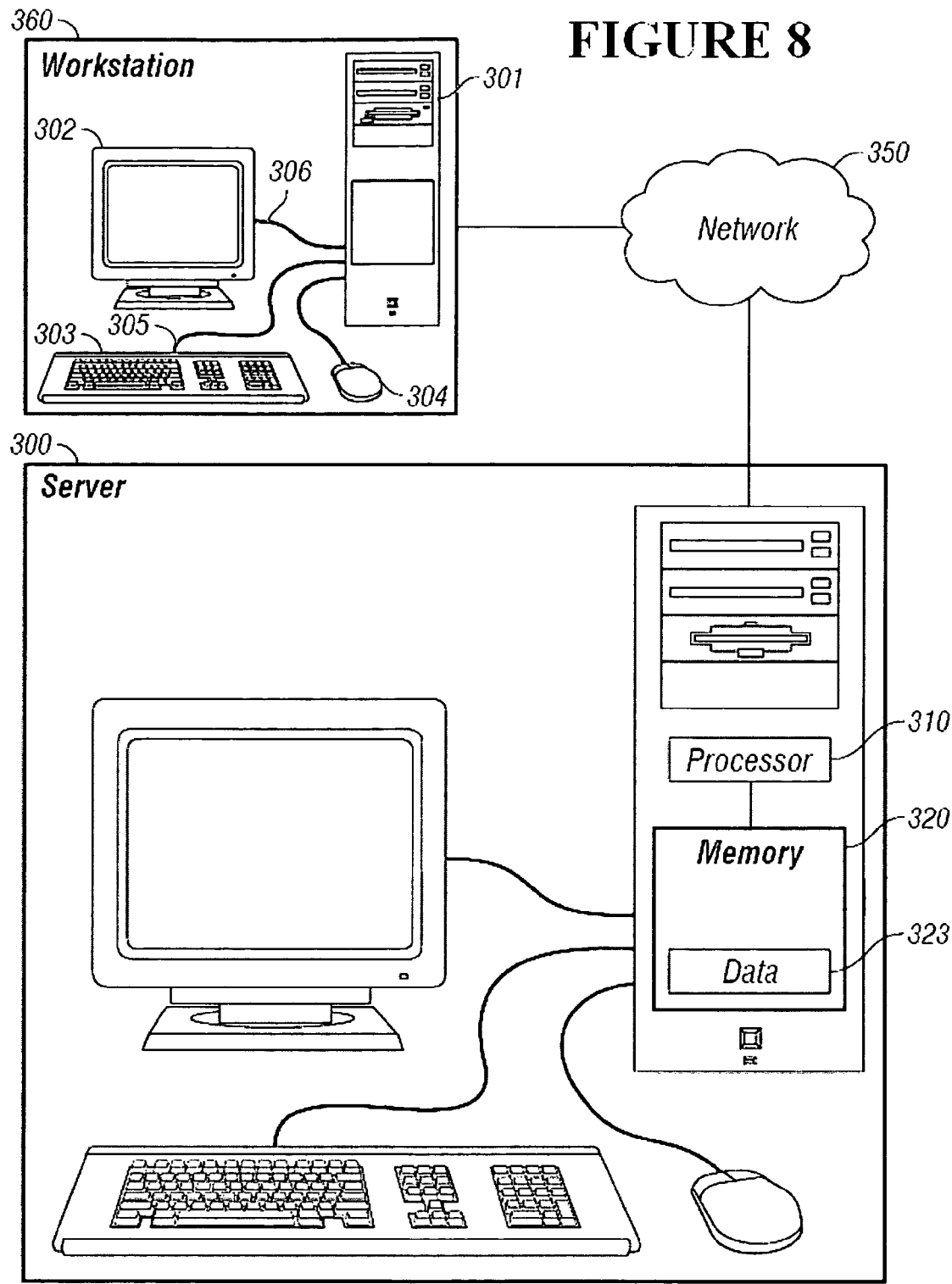
FIG. 8 depicts an illustration of a computer system to perform the embodied methods.

FIG. 8 depicts an illustration of a server to perform the embodied methods. A workstation 360 is coupled to a server 300 via a network 350. The workstation includes a workstation computer 301, which can be coupled to a video display 302 via an external graphics bus 306. The external graphics bus 306 can be an Advanced Graphics Port (AGP) compliant bus. The term "coupled" encompasses a direct connection, an indirect connection, or the like. Server 300 in one embodiment includes a processor 310, such as the Pentium™ III processor manufactured by Intel Corp. of Santa Clara, Calif. In another embodiment, the processor 310 can be an Application Specific Integrated Circuit (ASIC). Server 300 can include a memory 320 coupled to the processor. Memory 320 encompasses devices adapted to store digital information, such as Dynamic Random Access Memory (DRAM), Rambus™ DRAM (RDRAM), flash memory, a hard disk, an optical digital storage device, a combination thereof, etc. The workstation computer 301 can be coupled to a keyboard 303 and a mouse 304 via an external computer bus 305. In one embodiment, the external computer bus 305 is a Universal Serial Bus (USB) compliant bus. In one embodiment, the workstation computer 301 can include a graphical user interface (GUI) module 321 to implement a graphical user interface.

Memory 320 can include instructions adapted to be executed by the processor 310 to perform a method in accordance with an embodiment of the present invention. The term "instructions adapted to be executed" is meant to encompass any instructions that are ready to be executed in their present form (for example, machine code) by a processor, or require further manipulation (for example, compilation, decryption, decoding, or provided with an access code, etc.) to be ready to be executed by a processor (for example, processor 310).

Examples of network 350 include the internet, a WAN (wide area network), LAN (local area network), an intranet, a communications network, a computer network, a combination thereof, etc. In one embodiment, the server 300 is coupled to a storage device that typically stores data on a magnetic medium such as a magnetic disk. For example, the storage device may store application programs and associated data files/documents. Examples of documents include word processing documents, spreadsheet documents, HTML (Hypertext Markup Language) documents, and the like. Workstation 360 can access data stored in the storage device via server 300 and network 350. In an embodiment, workstation 360 can display information on display 302 by receiving information signals to server 300 via network 350. Examples of display information include data a GUI component, a web page, and the like.

Data 323 can encompass hierarchical data, non-hierarchical data, and the like. Data 323 can be a document corresponding to a particular application such as a word processing document, a spreadsheet document, an HTML document, and the like.

Computer instructions adapted to be executed by a processor to perform the embodied methods are stored on a computer-readable medium and distributed as software. The computer-readable medium can be a device that stores digital information. For example, a computer-readable medium includes a portable magnetic disk, such as a floppy disk; or a Zip™ disk, manufactured by the Iomega Corporation of Roy, Utah (Zip™ is a registered trademark of Iomega Corporation); or a Compact Disk Read Only Memory (CD-ROM) as is known in the art for distributing software. The computer-readable medium can be distributed to a user that has a processor suitable for executing instructions adapted to be executed While these embodiments have been described with emphasis on the embodiments, it should be understood that within the scope of the appended claims, the embodiments might be practiced other than as specifically described herein.

What is claimed is:

1. A computer readable medium having stored thereon a plurality of instructions, the plurality of instructions including instructions which, when executed by a processor, cause the processor to perform the method for accelerating a Sarbanes-Oxley (SOX) compliance process for management of a company, wherein the method comprises:
    a. defining scope components needed for Sarbanes-Oxley (SOX) compliance;
    b. establishing internal controls for achieving Sarbanes-Oxley (SOX) compliance for the scope components and operating the internal controls using an dynamic internal controls library comprising parameters;
    c. planning and testing the internal controls for achieving Sarbanes-Oxley (SOX) compliance for the scope components, and evaluating the internal controls for achieving Sarbanes-Oxley (SOX) compliance using the parameters of the internal controls library,
    d. remediating the internal controls for achieving Sarbanes-Oxley (SOX) compliance that are outside of the parameters of the dynamic internal controls library to maintain effective internal controls;
    e. monitoring the internal controls and the remediating of the internal controls on a real time basis for achieving Sarbanes-Oxley (SOX) compliance; wherein the step of monitoring the internal controls and the remediating of the internal controls comprises providing an executive dashboard on a real time basis for achieving Sarbanes-Oxley (SOX) compliance; and
    f. certifying the company by preparing certifications, assertions, and reports relative to the achieved Sarbanes-Oxley (SOX) compliance using the monitored internal controls and remediated internal controls.

2. The computer readable medium of claim 1, wherein the step of defining scope components comprises developing an annual risk assessment for entities within the defined scope components for Sarbanes-Oxley (SOX) compliance and creating an annual risk assessment report.

3. The computer readable medium of claim 1, wherein the step of defining scope components comprises associating a value amount for achieving Sarbanes-Oxley compliance for a company with the defined scope component.

4. The computer readable medium of claim 3, wherein the step of defining value for scope components comprises defining a member selected from the group consisting of: a process, an entity, a technology, a location, and combinations thereof.

5. The computer readable medium of claim 1, wherein the step of defining scope components comprises a member selected from the group consisting of: reviewing the defined scope components with an external auditor, validating the defined scope components with the external auditor, communicating the defined scope components to a company, maintaining a methodology for completing a Sarbanes-Oxley (SOX) compliance process, and combinations thereof.

6. The computer readable medium of claim 1, wherein the step of establishing internal controls and operating internal controls comprises:
    a. defining at least one activity and at least one step of each internal control;
    b. identifying an event, a technology, or combinations thereof, that creates a requirement to change at least one activity or at least one step of each internal control;
    c. identifying an event, a technology, or combinations thereof, that adds the internal controls;
    d. identifying an event, a technology, or a combination thereof, that sunsets the internal controls;
    e. communicating impact event information when there is a need to change the internal controls;
    f. updating the parameters of the dynamic internal controls library; and
    g. instructing employees to perform at least one activity or at least one step of each internal control.

7. The computer readable medium of claim 1, wherein the step of planning, testing, and evaluating internal controls for achieving Sarbanes-Oxley (SOX) compliance comprises:
    a. defining testing groups and testing cycles for each fiscal year;
    b. identifying internal controls to be tested by each testing group and in each testing cycle;
    c. identifying testing steps for each internal control to be tested;
    d. requesting evidence of internal controls operations to support testing steps for each internal control;
    e. examining evidence for completeness;
    f. performing testing steps to test effectiveness of each internal control;
    g. evaluating testing of each internal control using parameters of internal controls library; and h. communicating testing results of the internal controls to a member selected from the group consisting of: management of a company, owners of a company, audit committee for a company, and combinations thereof.

8. The computer readable medium of claim 1, wherein the evidence of internal controls operations comprises a member selected from the group consisting of: an observation, an answer to a query, a document validating performance of the internal controls, and combinations thereof.

9. The computer readable medium of claim 1, wherein the internal controls testing comprises a member selected from the group consisting of: remediation testing, testing of a previously tested internal control, or combinations thereof.

10. The computer readable medium of claim 1, wherein the step of remediating the internal controls for achieving Sarbanes-Oxley (SOX) compliance further comprises determining a need for internal controls remediation.

11. The computer readable medium of claim 1, wherein the step of remediating internal controls when a need is determined comprises:
   a. reviewing designs of the internal controls that failed testing of the internal controls;
   b. creating a remediation plan to remedy internal controls that failed testing;
   c. implementing the created remediation plan;
   d. testing the internal controls after implementing the created remediation plan; and
   e. communicating remediation test results of the internal controls to the management and owners of the company.

12. The computer readable medium of claim 1, wherein the step of providing the executive dashboard on a real time basis for achieving Sarbanes-Oxley (SOX) compliance comprises a member selected from the group consisting of: providing a real time display of internal controls operation, providing a real time display of internal controls testing, providing a real time display of remediation of internal controls, reporting on a request for remediation status, reporting on a request for evidence status, providing an deficiency evaluation on the performance of the internal controls, and combinations thereof.

13. The computer readable medium of claim 1, wherein the step of providing the executive dashboard on a real time basis for achieving Sarbanes-Oxley compliance comprises transmitting the executive dashboard on a real time basis to a member selected from the group consisting of: a board of directors, an audit committee, an external auditor, and combinations thereof.

14. The computer readable medium of claim 1, wherein the step of providing the executive dashboard on a real time basis for achieving Sarbanes-Oxley compliance comprises updating the executive dashboard consistent with the expansion of the defined scope components required for Sarbanes-Oxley (SOX) compliance for a company.

15. The computer readable medium of claim 1, wherein the step of providing the executive dashboard further comprises performing a written approval and sign-off process.

16. The computer readable medium of claim 1, wherein the step of performing a certification comprises:
   a. performing deficiency evaluations on the internal controls that fail as of a certain date;
   b. aggregating deficiency evaluation results using items from the controls library;
   c. determining effectiveness of internal controls;
   d. reviewing validated results with the external auditor;
   e. preparing Sarbanes-Oxley (SOX) compliance certifications and assertions;
   f. preparing financial results reports;
   g. issuing financial reports with Sarbanes-Oxley (SOX) compliance results.

17. The computer readable medium of claim 16, further comprising the step of performing the certification process by managing a sub-certification form completion process comprising: validating process narratives for completeness accuracy, revising documentation of the effectiveness of the operation of the internal controls, and facilitating sign-off on sub-certification by management and owners of the company.

18. The computer readable medium of claim 1, further comprising the step of performing the certification and assertion process by each management area certifying a member selected from the group consisting of: a design, maintenance, testing, and combinations thereof, of internal controls for Sarbanes-Oxley compliance.

* * * * *